United States Patent
Libbey et al.

(10) Patent No.: US 7,856,477 B2
(45) Date of Patent: Dec. 21, 2010

(54) METHOD AND SYSTEM FOR IMAGE VERIFICATION TO PREVENT MESSAGING ABUSE

(75) Inventors: Miles Libbey, Mountain View, CA (US); Len Fenkel, Pacifica, CA (US); Jing Zhu, Fremont, CA (US); Steven Kenichi Yoshimoto, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1084 days.

(21) Appl. No.: 10/817,126

(22) Filed: Apr. 2, 2004

(65) Prior Publication Data

US 2004/0199597 A1 Oct. 7, 2004

Related U.S. Application Data

(60) Provisional application No. 60/460,707, filed on Apr. 4, 2003.

(51) Int. Cl.
*G06F 15/16* (2006.01)
(52) U.S. Cl. .............. 709/206; 726/2; 726/22
(58) Field of Classification Search ............. 709/204, 709/206, 225, 207, 224; 713/201, 176, 153; 455/466, 456.4; 705/50; 726/14
See application file for complete search history.

(56) References Cited

U.S. PATENT DOCUMENTS

| | | | | |
|---|---|---|---|---|
| 6,199,102 B1 * | 3/2001 | Cobb | | 709/206 |
| 6,507,866 B1 * | 1/2003 | Barchi | | 709/207 |
| 6,779,021 B1 * | 8/2004 | Bates et al. | | 709/206 |
| 6,819,932 B2 * | 11/2004 | Allison et al. | | 455/466 |
| 6,868,498 B1 * | 3/2005 | Katsikas | | 726/14 |
| 6,937,868 B2 * | 8/2005 | Himmel et al. | | 455/456.4 |
| 6,941,348 B2 * | 9/2005 | Petry et al. | | 709/206 |
| 6,957,259 B1 * | 10/2005 | Malik | | 709/225 |
| 7,149,801 B2 * | 12/2006 | Burrows et al. | | 709/225 |
| 7,203,749 B2 * | 4/2007 | Hiraga | | 709/224 |
| 7,249,162 B2 * | 7/2007 | Rounthwaite et al. | | 709/206 |
| 7,333,956 B2 * | 2/2008 | Malcolm | | 705/50 |
| 7,380,126 B2 * | 5/2008 | Logan et al. | | 713/176 |

(Continued)

OTHER PUBLICATIONS

L. von Ahn et al., "Telling Humans and Computers Apart Automatically", Communications of the ACM, Feb. 2004, vol. 47, No. 2, pp. 57-60.

(Continued)

*Primary Examiner*—Dustin Nguyen
(74) *Attorney, Agent, or Firm*—Frommer Lawrence & Haug LLP; Jamie L. Wiegand (57) ABSTRACT

The invention is directed to a system and method for determining if a "spam" message is originating from a messaging account by challenging a particular client's outbound email usage with a test that requires verification of content that is easily understood by a human being, not an automated computer program such as those used by "spammers." If a limit on the number of recipients for outbound messages has been exceeded, a test is presented the next time a client attempts to send a message. The client must successfully answer the test within a relatively short period of time or else the ability to send messages will be disabled. Once disabled, the client can reinstate the ability to send messages by contacting a representative of the message system out of band, e.g., a telephone call to confirm legitimate outbound email use.

30 Claims, 8 Drawing Sheets

U.S. PATENT DOCUMENTS

| | | | |
|---|---|---|---|
| 7,672,998 B1* | 3/2010 | Haskins et al. | 709/206 |
| 2002/0169954 A1* | 11/2002 | Bandini et al. | 713/153 |
| 2003/0088633 A1* | 5/2003 | Chiu et al. | 709/206 |
| 2003/0204569 A1* | 10/2003 | Andrews et al. | 709/206 |
| 2003/0220978 A1* | 11/2003 | Rhodes | 709/206 |
| 2003/0236847 A1* | 12/2003 | Benowitz et al. | 709/206 |
| 2004/0003283 A1* | 1/2004 | Goodman et al. | 713/201 |
| 2004/0015554 A1* | 1/2004 | Wilson | 709/206 |
| 2004/0199595 A1* | 10/2004 | Banister et al. | 709/207 |
| 2004/0205135 A1* | 10/2004 | Hallam-Baker | 709/206 |
| 2004/0215721 A1* | 10/2004 | Szeto et al. | 709/204 |
| 2004/0243844 A1* | 12/2004 | Adkins | 713/201 |
| 2006/0168006 A1* | 7/2006 | Shannon et al. | 709/206 |

OTHER PUBLICATIONS

L. von Ahn et al., (~ 2003) "CAPTCHA: Using Hard AI Problems for Security", pp. 1-18.

* cited by examiner

C = Current hour recipient count
L = hourly recipient limit
R = random number
Y = constant

OR

$$D >= X/2 + (X - X/2) * R$$

D = current Daily recipient count
X = Daily recipient limit

OR

$$T / 1000 = Integer$$

T = total recipient count

<u>RECIPIENT COUNT STATEMENT</u>

FIG. 6

FIG. 7  *GIMPY*

FIG. 8  *BONGO*

METHOD AND SYSTEM FOR IMAGE VERIFICATION TO PREVENT MESSAGING ABUSE

CROSS REFERENCE TO RELATED APPLICATION

This Utility Application claims priority from U.S. Provisional Application No. 60/460,707, filed Apr. 4, 2003, the benefit of the earlier filing date is hereby claimed under 35 U.S.C. 119(e).

FIELD OF THE INVENTION

The present invention is generally directed to electronic mail (email), and more particularly, to employing a challenge to verify outbound email traffic associated with an email account.

BACKGROUND OF THE INVENTION

Recently, tools for administrators of email systems have become available to prevent their clients from receiving unsolicited/unauthorized inbound email (spam). For example, several types of firewalls and customizable filters are available to prevent inbound spam email. Adaptive filters, such as those based on bayesian probability models, have also been relatively effective in preventing some of the more sophisticated spam email, such as spam that tries to obfuscate source addresses and/or general content. Although tools to manage inbound spam email have improved in efficiency and efficacy, the "spammers" have become equally ingenious in devising ways to beat the latest preventive methods. Also, the amount of system resources that must be dedicated to handling the seemingly ever increasing amount of inbound spam email can seriously reduce the amount of resources available for legitimate email traffic.

Although email administrators have had access to a wide variety of methods to prevent inbound spam emails for some time, preventing the abuse of an email system employed to originate outbound spam email has not received the same degree of attention. Notably, most spam prevention methods are directed to stopping inbound spam email, not outbound. Also, it has become known that a significant portion of spam email originates in email systems that enable anyone to anonymously sign up for multiple email accounts. Unfortunately, spammers are known to abuse this anonymity by automating the sending of large amounts of spam email from multiple email accounts, often to users of the same email system. To prevent such abuse, email administrators could benefit from a method that could challenge a particular client's outbound email usage that exceeds certain limits in a manner that is incompatible with an automated response, i.e., a challenge that is easily solved by a human being and difficult to answer for an automated computer program such as those employed by spammers.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references. The meaning of "in" includes "in" and "on." The term "coupled" means a direct connection between the items that are connected, or an indirect connection through one or more intermediary devices or components.

Briefly stated, the present invention is directed to a system and method for determining if a "spam" message is originating from a particular account by challenging a particular client's outbound message usage with a test that requires verification of content that is easily understood by a human being, but not an automated computer program such as those used by "spammers." If a limit on the number of recipient for outbound messages is exceeded, a test is presented the next time a client attempts to send a message. Also, if the client fails to successfully answer the test within a relatively short period of time, their ability to send a message is disabled. The time limit helps to prevent the batching of tests for several accounts that are used to automatically send relatively large numbers of outbound messages. Once disabled, the client can reinstate the ability to send a message by contacting a representative of the message system out of band, e.g., a telephone call to confirm legitimate outbound message use. Additionally, if the test is correctly answered or a client reinstates their account out of band, the recipient counts and the various limits are reset.

Different limits based on a recipient count of outbound messages can be calculated hourly, daily, and over the lifetime of a particular account. Also, a random number can be used for determining various recipient count limits so that the limits will vary within a range at each reset. Moreover, the type of message can include, but is not limited to, email, blog, message board, Short Message Service (SMS), Multi-Media Message Service (MMS), instant messaging (IM), and the like.

Additionally, a profile can be generated for each client to determine different recipient count limits. For example, a relatively new client might have relatively low hourly, daily and lifetime limits for outbound messages. In contrast, the profile for a longtime client could enable the invention to provide relatively high hourly, daily, and/or lifetime limits. However, if a longtime client failed the image verification test, the profile could be modified so that the limits are reduced to those typically associated with a new client. Moreover, a client could modify their profile by paying a fee to extend their limits and/or advising in advance of certain occasions, such as holidays, birthdays, weddings, and the like.

The image test can be any type that has been shown to be difficult for a computer program to verify, but relatively simple for a human being. For example, an image based Captcha test can be employed, such as Gimpy, Bongo, Pix, and the like. In one embodiment, the number of false positives for the image test can be reduced if the content of an outbound message is further analyzed by a filtering system that identifies spam messages.

Figure 7:
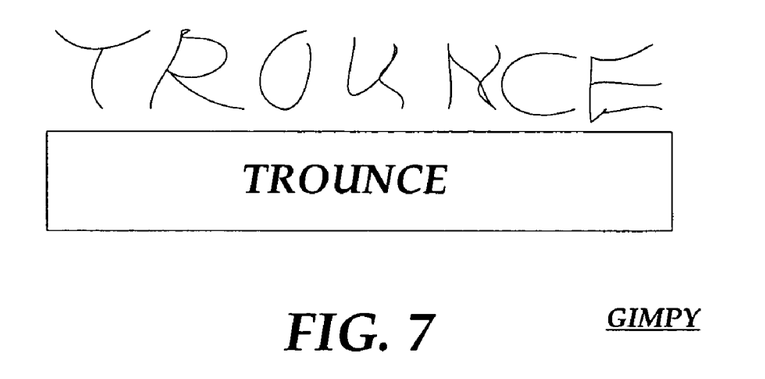
FIG. 7 illustrates a block diagram of an exemplary image verification test based on a Gimpy Captcha challenge.

An exemplary Gimpy image test picks at least one word from a dictionary and employs various filters and effects to distort and/or deform displayed text. Next, a user is prompted to enter the displayed text in a box. For the Gimpy image test, distortions and deformations are chosen that are relatively simple for a human being to recognize the underlying text, but exceedingly difficult for a computer program to do so. An exemplary Gimpy image test is illustrated in FIG. 7.

Figure 8:
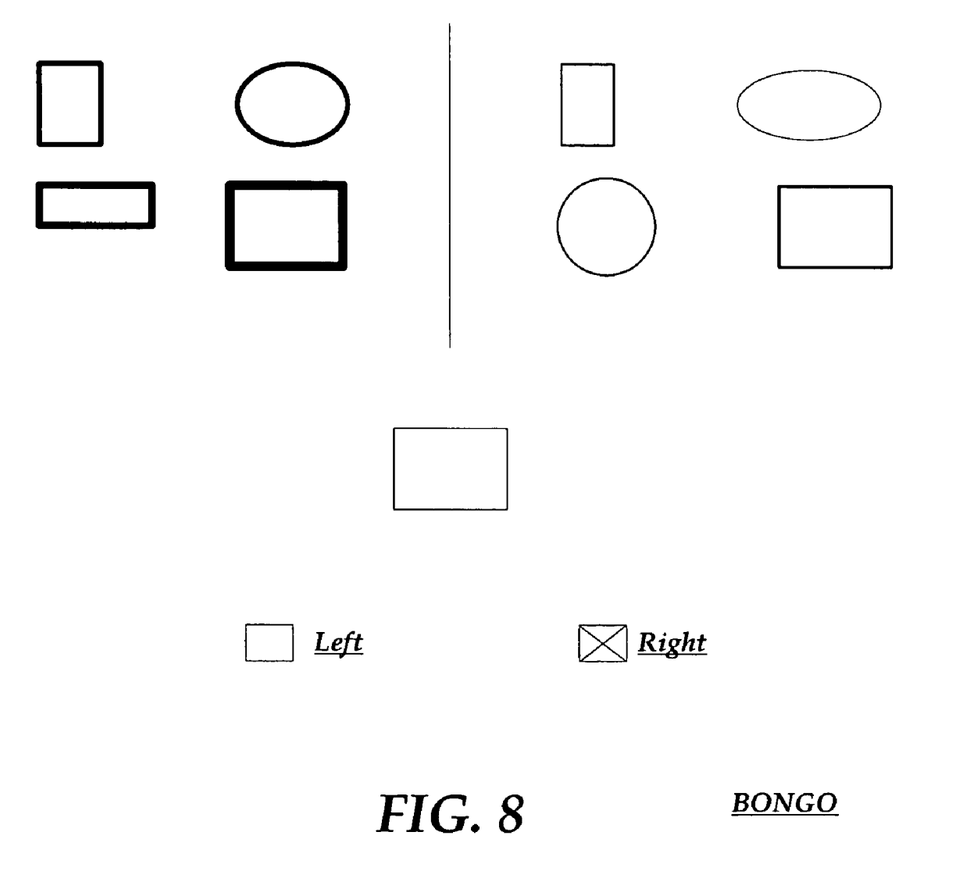
FIG. 8 shows a block diagram of an exemplary image verification test based on a Bongo Captcha challenge, in accordance with the present invention.

In a Bongo image test, a user is prompted to solve a visual pattern recognition problem. FIG. 8 illustrates an exemplary Bongo image test where the symbols on the right are drawn with a light line weight and the symbols on the left are drawn with a heavy line weight. To solve the Bongo test, the user has to notice the predominant similarities in each group and to which group (left or right) a separate symbol belongs.

Although not shown, in a Pix image test, several different images that mostly include the same subject are distorted and then displayed. A user is prompted to enter the name of the subject to pass the Pix image test.

In another embodiment, a sound based Captcha test may be used such as Eco, instead of an image test in substantially the same manner. A visually impaired client can make use of the Eco sound test in substantially the same manner as the image based tests discussed elsewhere in the specification. For example, to perform a sound test, a word or sequence of numbers is picked and, at random, the word or number is rendered into a distorted sound clip. Upon playing the sound clip, the user is prompted to enter the contents of the distorted sound clip. In this case, the distortion in the sound clip is chosen so that it is relatively easy for a human being to identify the content but difficult for a computer program.

Illustrative Operating Environment

FIGS. 1-4 show components of an exemplary environment in which the invention may be practiced. Not all the components may be required to practice the invention, and variations in the arrangement and type of the components may be made without departing from the spirit or scope of the invention.

Figure 1:
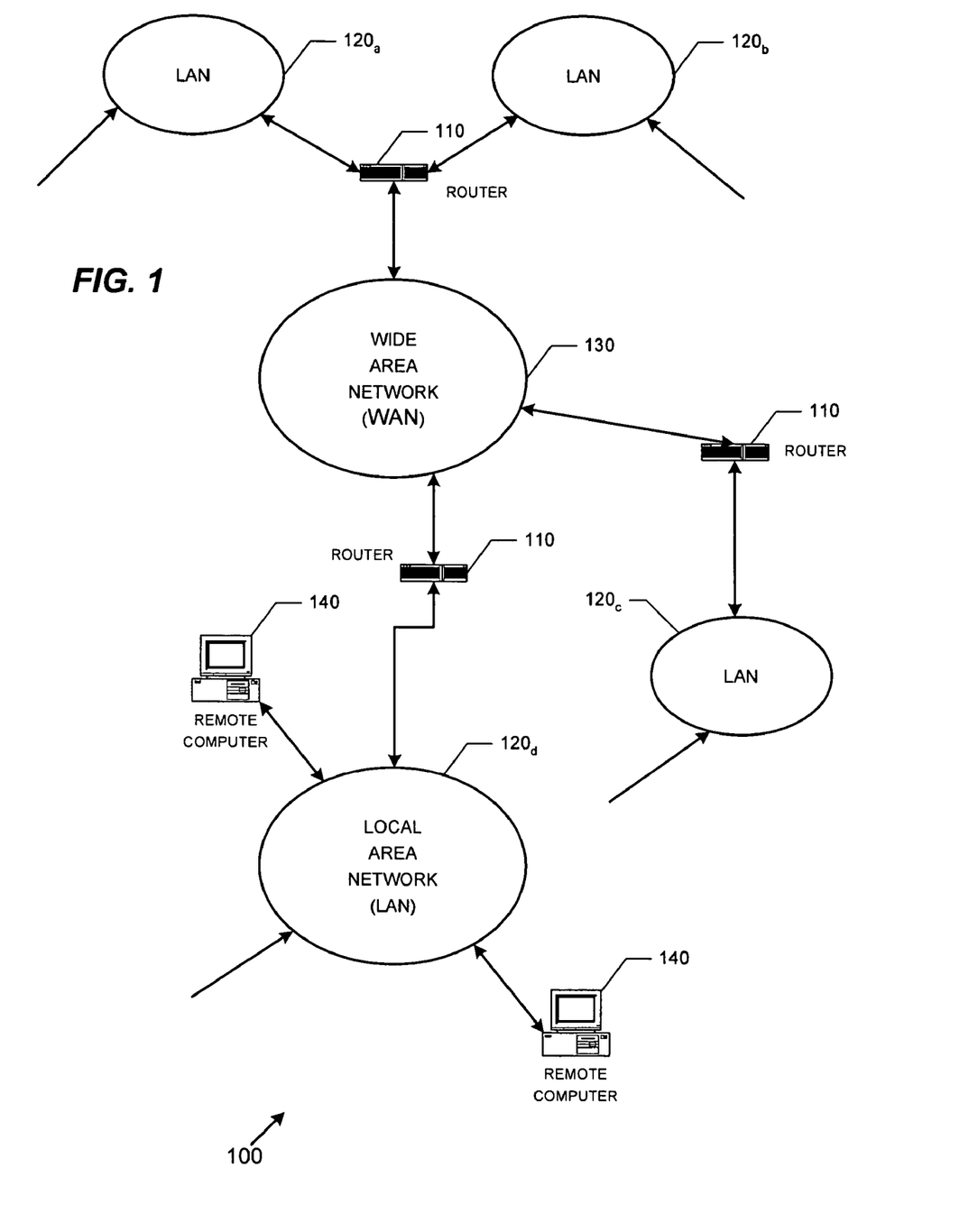
FIGS. 1-4 show schematic diagrams of an illustrative operating environment for the present invention.

FIG. 1 shows a plurality of local area networks ("LANs") $120_{a-d}$ and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs $120_{a-d}$ or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use Transmission Control Protocol/Internet Protocol ("TCP/IP") and other packet based protocols to communicate with one another. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
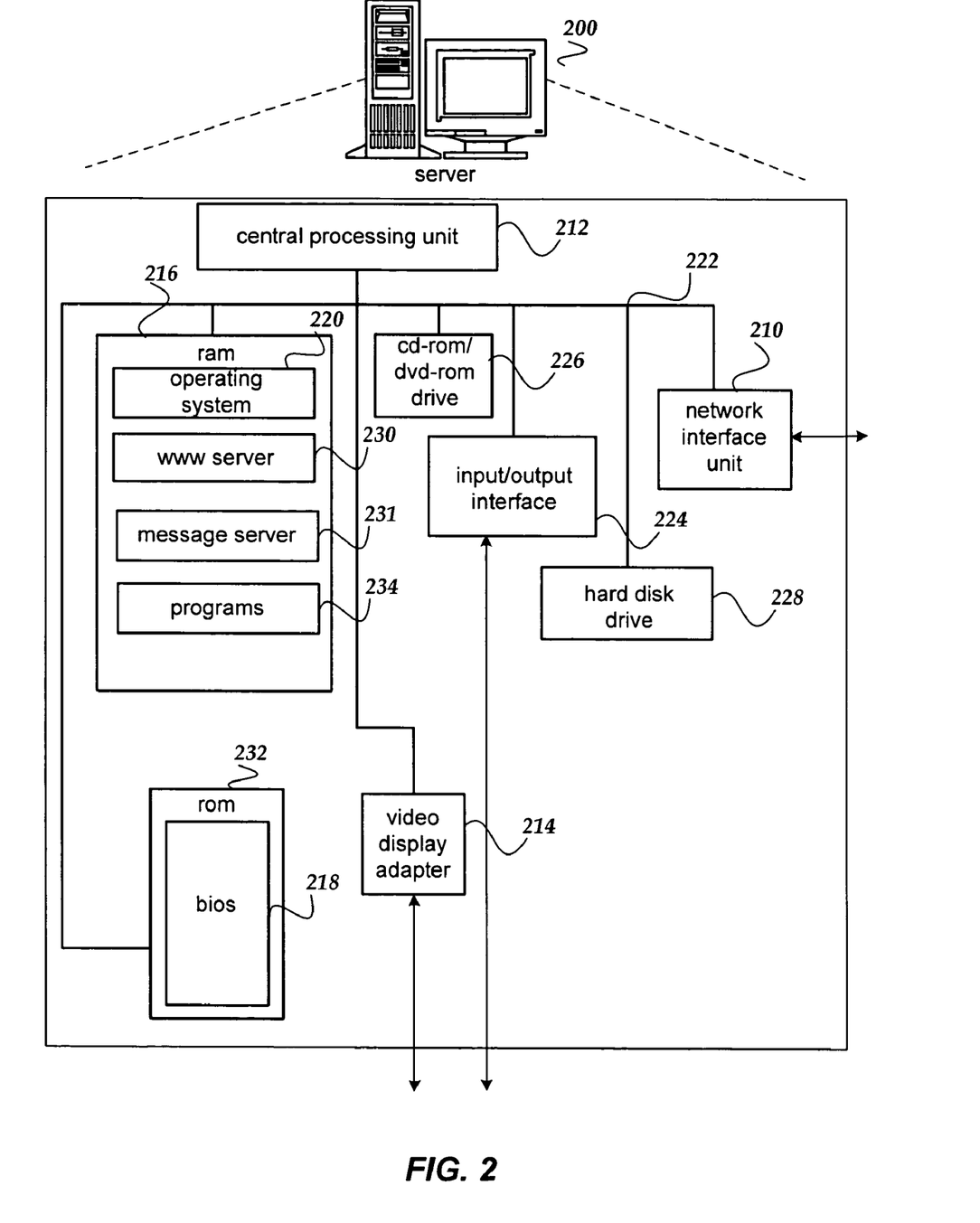

FIG. 2 shows an exemplary server that may operate to provide a World Wide Web site (web site), and a message system, among other things. When providing a web site, server 200 transmits pages to a browser application executing on the requesting devices to carry out this process. For instance, server 200 may communicate pages and forms for setting up a messaging account for the user. Moreover, server 200 may transmit pages to a requesting device that allow the user to participate in a web site, such as send email to another user. The transactions may take place over the Internet, WAN/LAN 100, or some other communications network known to those skilled in the art.

Those of ordinary skill in the art will appreciate that the server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. Those of ordinary skill in the art will appreciate that network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222.

The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a web site. More specifically, the mass memory may store applications including WWW server application 230, message server application 231, and programs 234. WWW server application 230 includes computer executable instructions which, when executed by server 200, generate browser displays, including performing the logic described above. Server 200 may include a JAVA virtual machine, an SMTP handler application for transmitting and receiving messages, an HTTP handler application for receiving and handing HTTP requests, and an HTTPS handler application for handling secure connections. The HTTPS handler application may also be used for communication with an external security application to send and receive sensitive information, such as email, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by message server 231 and WWW server 230.

Figure 3:
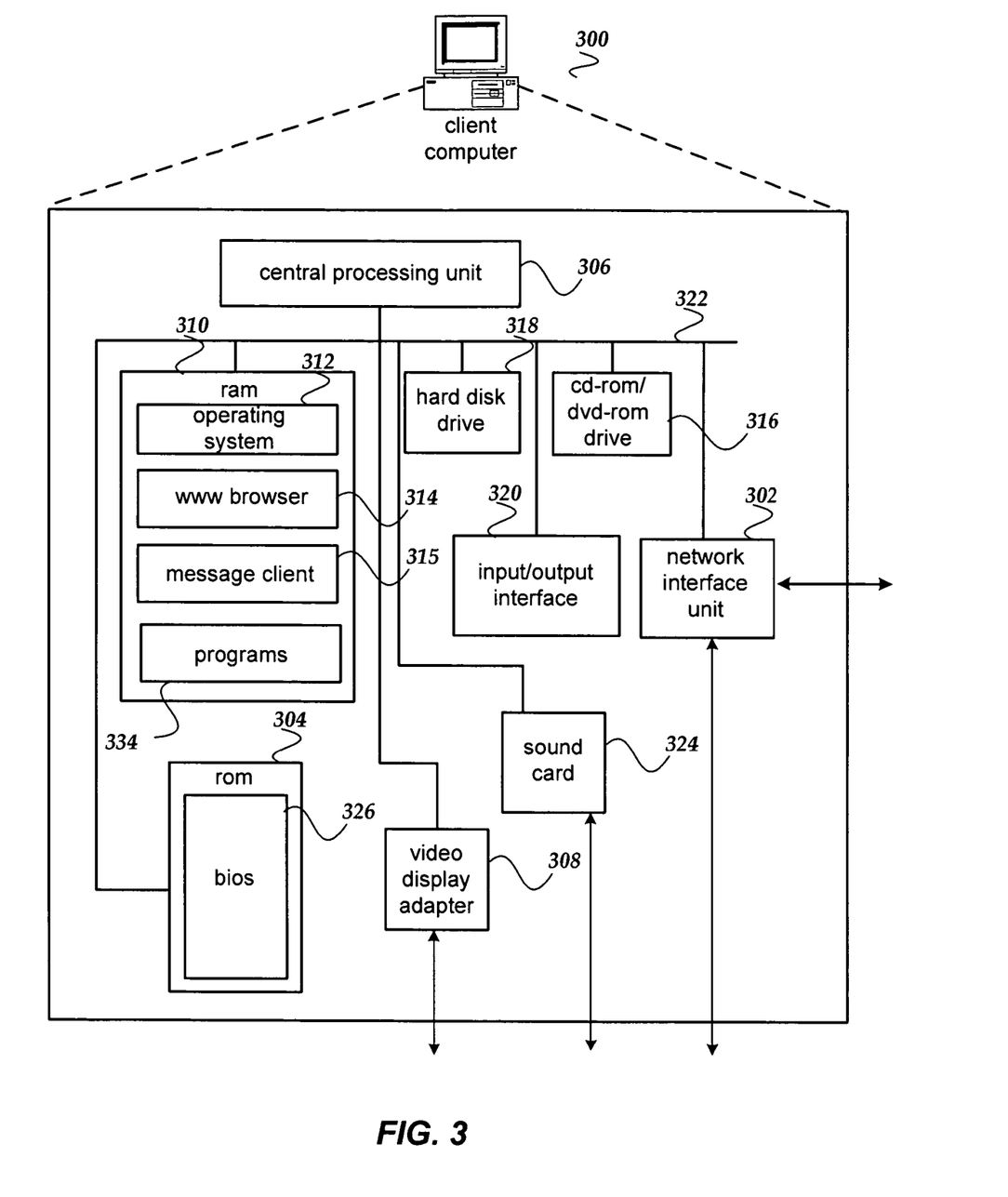

FIG. 3 depicts several components of client computer 300. Those of ordinary skill in the art will appreciate that client computer 300 may include many more components than those shown in FIG. 3. However, it is not necessary that those generally-conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Those of ordinary skill in the art will appreciate that network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point to point protocol ("PPP") connection or a serial line internet protocol ("SLIP") connection as known to those skilled in the art.

Client computer 300 also includes BIOS 326, processing unit 306, video display adapter 308, and memory. The memory generally includes RAM 310, ROM 304 and a permanent mass storage device, such as a disk drive. The memory stores operating system 312 and programs 334 for controlling the operation of client computer 300. The memory also includes message client 315 for accessing messages over a network, and browser application 314 for accessing web sites. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

Figure 4:
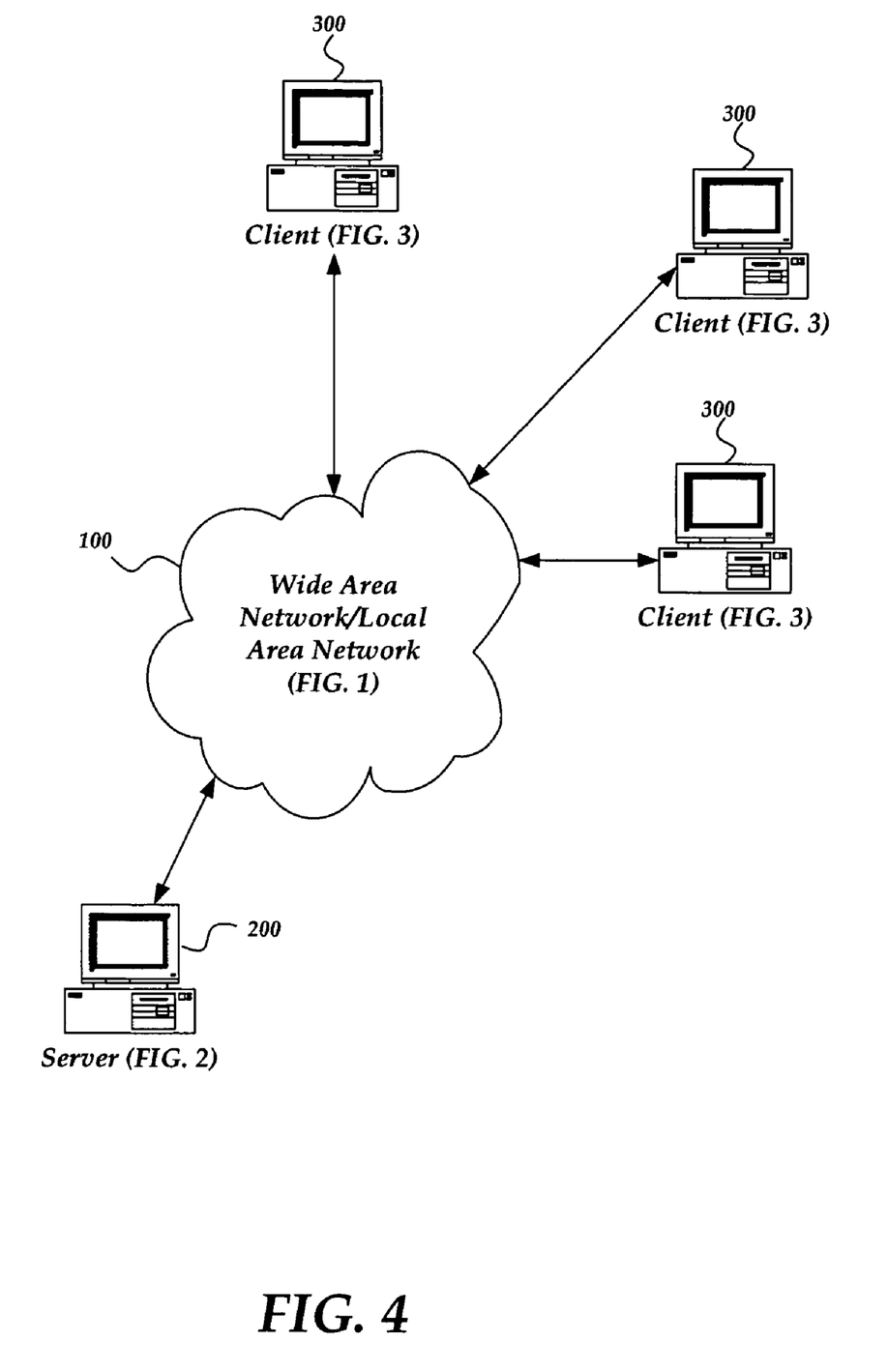

FIG. 4 illustrates an overview of an exemplary environment in which the invention operates in which multiple clients 300 can be in communication with at least one server 200 that provides message services over network 100. Although FIG. 4 refers to client computer 300 as an exemplary client device, other types of client devices may be employed with the invention. For example, multiprocessor systems, microprocessor-based or programmable consumer electronics, network PCs, PDAs, wearable computers, and the like. These client devices may also include devices that typically connect to network 100 using a wireless communications medium, e.g., mobile telephones, smart phones, pagers, walkie talkies, radio frequency (RF) devices, infrared (IR) devices, integrated devices combining one or more of the preceding devices, and the like.

Illustrative Image Verification Method

Figure 5A:
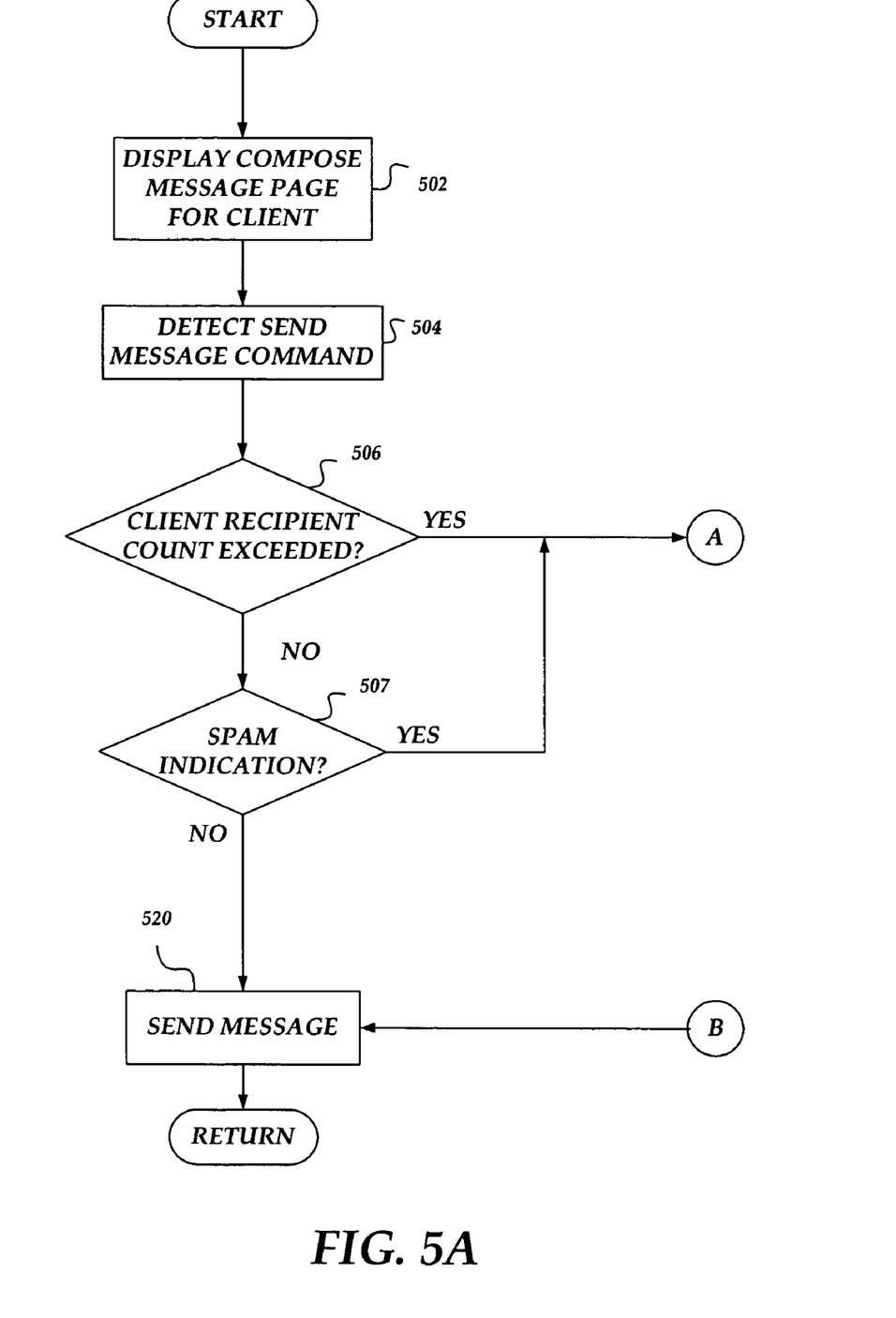
FIGS. 5A and 5B illustrates a flow diagram for challenging a client's message usage based on an image verification test.
Figure 5B:
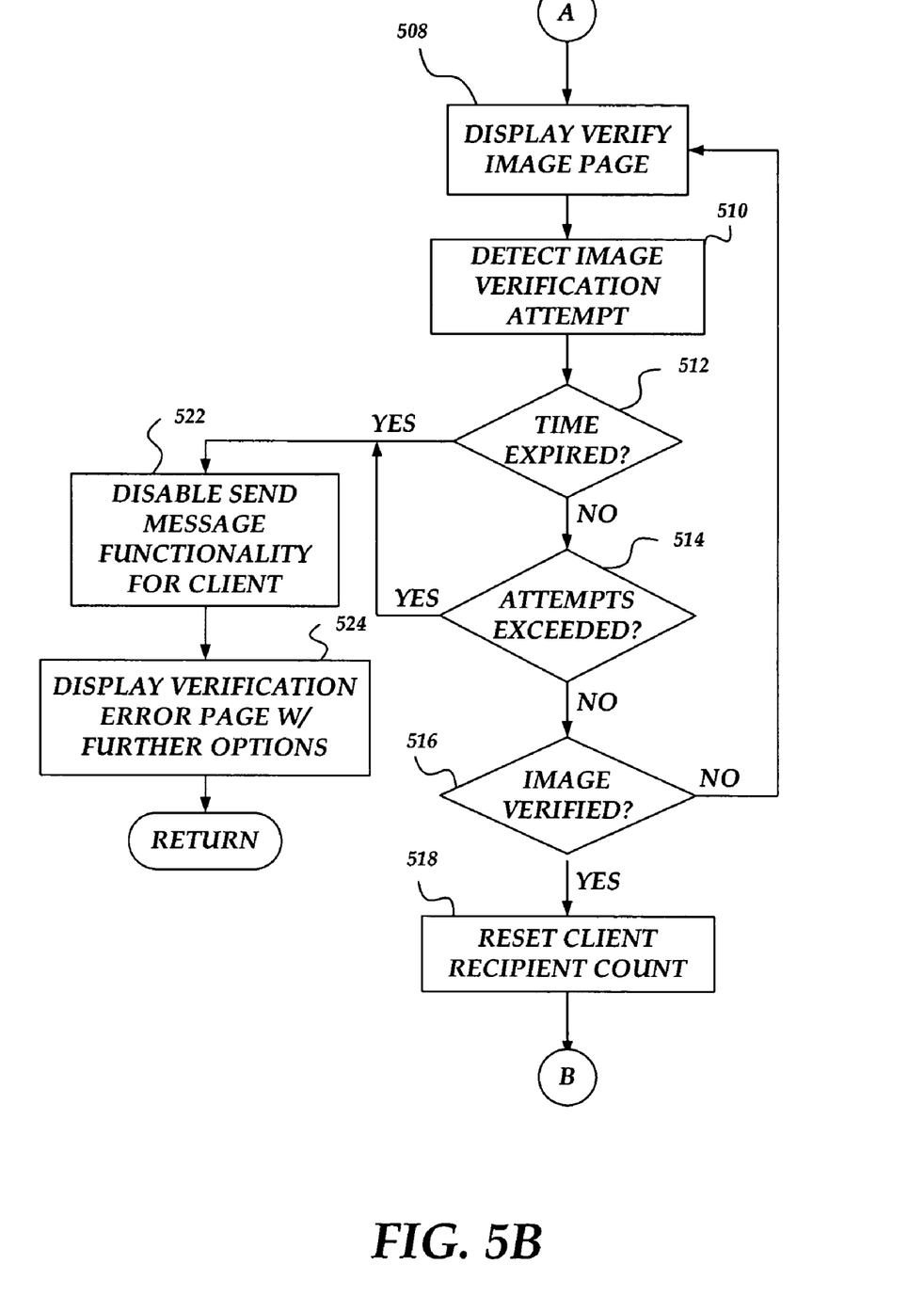

FIGS. 5A and 5B illustrate a flow chart for exemplary actions for employing an image based test to verify outbound message activity is initiated by a human being instead of a computer program that automatically sends "spam" messages to other messaging accounts. Outbound message activity that exceeds at least one limit causes message functionality to be disabled until a human being can verify the message usage.

Figure 6:
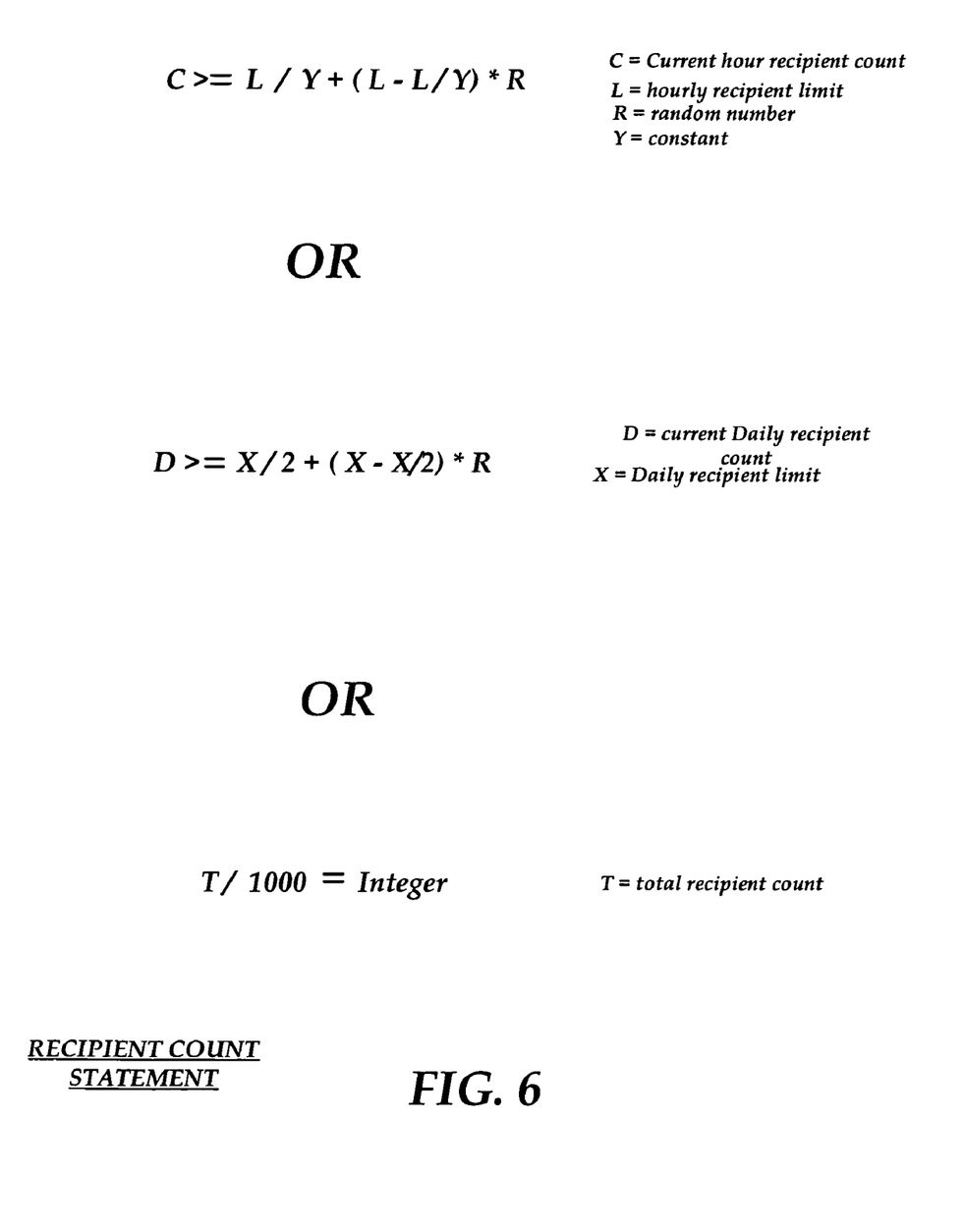
FIG. 6 shows an exemplary statement that can be used in determining if a limit for the number of recipients for a particular client's message has been exceeded.

In FIG. 5A, the process moves from a start block to block 502 where in response to a request from a client, a page that enables a client to compose a message is displayed. At block 504, the process detects if the send message command has been selected for a message composed in the page. After the send command is detected, the process steps to decision block 506 where recipient count is compared to at least one of a client's limits, e.g., hourly, daily, and lifetime. Exemplary methods for determining these limits are shown in FIG. 6 and discussed in greater detail below. Also, if the process determines at decision block 506 that none of the limits are exceeded, then it moves to decision block 507. At decision block 507, a determination is made whether there is an indication that the message is spam. This indication may be provided by one or more filters that detect message content and/or a recipient(s) that has an association with spam. If the determination at decision block 507 is false (no spam indicated), then the process advances to block 520 where the message system sends the composed message to each of the intended recipients. Next, the process advances to a return block and returns to performing other actions.

Alternatively, at decision block 506, if the process does determine that a recipient limit has been exceeded, it flows to block 508 (FIG. 5B) where a verify image page is displayed. Also, at if the determination at decision block 507 was affirmative (spam indicated), the process would move to block 508 and perform substantially the same actions. In one embodiment, a Captcha image test may be employed, such as Gimpy, Bongo, Pix, and the like. In another embodiment (not shown), a sound based test, such as an Eco sound test, can be employed in substantially the same manner, either in combination with the image test or separate.

In FIG. 5B, the process flows from block 508 to block 510 where the process waits for an attempt to verify the image test. If the attempt has occurred or a determined period of time has been exceeded, the process moves to decision block 512. The process determines if the predetermined period of time to solve the image test has expired. If affirmative, the process moves to block 522 where at least the ability to send a message is disabled for the client. The process moves to block 524 where a verification error page is displayed, which typically displays information that the client can use to contact a representative of the message system to reinstate the disabled messaging functionality. Next, the process flows to a return block and returns to performing other actions.

However, at decision block 512, if the process determines that the time period to solve the test has not expired, it moves to decision block 514. Here, another determination is made whether the total number of attempts to solve the test has been exceeded. If affirmative, the process jumps to block 522 and performs substantially the same steps discussed above.

In the alternative, at decision block 514, if the process determines that the number of attempts to solve the test is not yet exceeded, it steps to decision block 516. At decision block 516, a determination is made as to whether the image test is verified, e.g., solved. If not, the process jumps back to block 508 where substantially the same actions discussed above are performed again. However, at block 508, a different image test than the previous one is typically displayed for solving by the client.

At decision block 516, if the determination is made that the image test is verified, the process moves to block 518 where the recipient count for the client are cleared and reset. The process moves to block 520 (FIG. 5A) and sends the message to the intended recipients. Next, the process flows to a return block and returns to performing other actions.

FIG. 6 illustrates three different algorithms that in concert form an exemplary recipient count statement for determining if hourly, daily, or lifetime limits for a client have been met and/or exceeded. It is important to note that the introduction of a random number into the hourly and daily algorithms causes the actual recipient count limits to vary each time they are reset between some percentage of their maximum limits. The random number is typically provided between zero and one inclusive. Also, the constant number "Y" enables the image test to be displayed at some percentage that is less than the maximum limit. The recipient count statement shown is exemplary and any number of various methods could be further employed to determine limits based on other factors, such as holidays, birthdays, special events, and client profiles.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for managing outbound message usage, comprising:

determining a count of each recipient for each outbound message associated with a client;

if the count of each recipient is at least equal to a limit over at least one period of time, providing a visual challenge to the client; and if the provided visual challenge is unresolved, disabling the client's outbound message usage until the visual challenge is resolved, wherein the client's outbound message usage includes a message composed by the client before the providing of the visual challenge to the client, and wherein disabling the client's outbound message usage occurs prior to sending the composed message for the client over a network from a messaging system employed to originate each outbound message associated with the client, and wherein disabling the client's outbound message usage further includes disabling an operable ability of the client to initially send any composed message to the messaging system for sending to any recipient.

2. The method of claim 1, further comprising if at least one outbound message associated with the client is indicative of spam for at least one recipient, providing the visual challenge to the client.

3. The method of claim 1, wherein the visual challenge further comprises an auditory challenge, and wherein until at least one of the visual challenge and the auditory challenge is resolved, disabling the client's outbound message usage.

4. The method of claim 1, wherein the visual challenge includes at least one Captcha test.

5. The method of claim 1, wherein the visual challenge further comprises an auditory challenge, and wherein the auditory challenge includes at least one sound clip that is filtered to distort the playing of the sound clip for the auditory challenge.

6. The method of claim 1, further comprising:

determining another count for each attempt to resolve the visual challenge; and if the other count for each attempt is at least equal to another limit, disabling the client's outbound message usage.

7. The method of claim 1, further comprising if the provided visual challenge is unresolved over a predetermined period of time, disabling the client's outbound message usage.

8. The method of claim 1, further comprising if the visual challenge is resolved, resetting the count for each recipient of each outbound message associated with the client.

9. The method of claim 1, wherein a type of the message includes at least one type of email, blog, message board, Short Message Service (SMS), Multi-Media Message Service (MMS), and instant messaging (IM).

10. The method of claim 1, further comprising if the client's outbound message usage is disabled, providing instructions for an out of band communication by the client for re-enabling the client's outbound message usage.

11. The method of claim 1, further comprising employing a recipient count statement to determine the count for each recipient for each outbound message associated with the client, wherein the recipient count statement determines at least one of a current hour recipient count, a current daily recipient count, and a total recipient count.

12. A client for enabling management of outbound message usage, comprising:
   a memory for storing instructions; and
   a processor for enabling the processing of instructions to perform actions, including:
      enabling a determination of a count of each recipient for each outbound message associated with the client;
      if the count of each recipient is at least equal to a limit over at least one period of time, enabling a visual challenge to be provided to the client; and
      if the provided visual challenge is unresolved, enabling a disablement of the client's outbound message usage until the visual challenge is resolved, wherein the client's disabled outbound message usage includes disabling the client's operable ability to initially send any message composed by the client to an outbound message server before the visual challenge is enabled to be provided to the client, and wherein enabling the disablement of the client's outbound message usage occurs without employing an ability of the outbound message server to send any composed message for the client over a network from the outbound message server employed by the client to originate each outbound message associated with the client.

13. The client of claim 12, wherein the actions further comprise if at least one outbound message associated with the client is indicative of spam for at least one recipient, enabling the visual challenge to be provided to the client.

14. The client of claim 12, wherein the visual challenge further comprises an auditory challenge, and wherein until at least one of the visual challenge and the auditory challenge is resolved, disabling the client's outbound message usage.

15. The client of claim 12, wherein the actions further comprise:
   enabling a determination of another count for each attempt to resolve the visual challenge; and
   if the other count for each attempt is at least equal to another limit, enabling a disablement of the client's outbound message usage.

16. The client of claim 12, wherein the actions further comprise if the provided visual challenge is unresolved over a predetermined period of time, enabling a disablement of the client's outbound message usage.

17. The client of claim 12, wherein the actions further comprise if the visual challenge is resolved, enabling a resetting of the count for each recipient of each outbound message associated with the client.

18. The client of claim 12, wherein a type of the message includes at least one type of email, blog, message board, Short Message Service (SMS), Multi-Media Message Service (MMS), and instant messaging (IM).

19. The client of claim 12, wherein the actions further comprise if the client's outbound message usage is disabled, providing instructions for an out of band communication by the client for re-enabling the client's outbound message usage.

20. The client of claim 12, wherein the actions further comprise enabling a recipient count statement to determine the count for each recipient for each outbound message associated with the client, wherein the recipient count statement determines at least one of a current hour recipient count, a current daily recipient count, and a total recipient count.

21. A server for enabling management of outbound message usage, comprising:
   a memory for storing instructions; and
   a processor for enabling the processing of instructions to perform actions, including:
      enabling a determination of a count of each recipient for each outbound message associated with a client;
      if the count of each recipient is at least equal to a limit over at least one period of time, enabling a visual challenge to be provided to the client; and
      if the provided visual challenge is unresolved, enabling a disablement of the client's outbound message usage until the visual challenge is resolved, wherein the client's outbound message usage includes sending any outbound message for the client from the server over a network connecting the server to each recipient, and wherein enabling the disablement of the client's outbound message usage disables an operable ability by the client to initially send any outbound message from the client to the server, and sending, from the server, a message associated with enabling the visual challenge to be provided to the client.

22. The server of claim 21, wherein the actions further comprise if at least one outbound message associated with the client is indicative of spam for at least one recipient, enabling the visual challenge to be provided to the client.

23. The server of claim 21, wherein the visual challenge further comprises an auditory challenge, and wherein until at least one of the visual challenge and the auditory challenge is resolved, disabling the client's outbound message usage.

24. The server of claim 21, wherein the actions further comprise:
   enabling a determination of another count for each attempt to resolve the visual challenge; and
   if the other count for each attempt is at least equal to another limit, enabling a disablement of the client's outbound message usage.

25. The server of claim 21, wherein the actions further comprise if the provided visual challenge is unresolved over a predetermined period of time, enabling a disablement of the client's outbound message usage.

26. The server of claim 21, wherein the actions further comprise if the visual challenge is resolved, enabling a resetting of the count for each recipient of each outbound message associated with the client.

27. The server of claim 21, wherein a type .of the message includes at least one type of email, blog, message board, Short Message Service (SMS), Multi-Media Message Service (MMS), and instant messaging (IM).

28. The server of claim 21, wherein the actions further comprise if the client's outbound message usage is disabled, providing instructions for an out of band communication by the client for re-enabling the client's outbound message usage.

29. The server of claim 21, wherein the actions further comprise enabling a recipient count statement to determine the count for each recipient for each outbound message associated with the client, wherein the recipient count statement determines at least one of a current hour recipient count, a current daily recipient count, and a total recipient count.

30. A computer readable storage medium encoded with instructions executable by a computer to cause the computer to perform actions for the management of outbound message usage, the actions comprising:
   enabling a determination of a count of each recipient for each outbound message associated with a client;
   if the count of each recipient is at least equal to a limit over at least one period of time, enabling a visual challenge to be provided to the client; and
   if the provided visual challenge is unresolved, enabling a disablement of the client's outbound message usage until the visual challenge is resolved, wherein the outbound message usage comprises originating any outbound message associated with the client from the computer over a network coupled to the computer, and wherein enabling the disablement of the client's outbound message usage disables an operable ability by the client to initially send any outbound message from the client to another client, and prevents the sending of any outbound message associated with the recipient count that enabled the providing of the visual challenge.

* * * * *